United States Patent [19]

Leap et al.

[11] Patent Number: 5,429,894
[45] Date of Patent: Jul. 4, 1995

[54] SILVER-IRON BATTERY

[75] Inventors: George D. Leap, Plum Boro; Gary A. Bayles, Pittsburgh, both of Pa.

[73] Assignee: Westinghouse Elec. Corp., Pittsburgh, Pa.

[21] Appl. No.: 161,016

[22] Filed: Dec. 3, 1993

[51] Int. Cl.$^6$ ............................................. H01M 4/02
[52] U.S. Cl. ..................... 429/219; 429/144; 429/210; 429/211; 429/212; 429/215; 429/221; 29/623.4
[58] Field of Search ............... 429/144, 210, 211, 212, 429/215, 219, 221; 29/623.4

[56] References Cited

U.S. PATENT DOCUMENTS

| | | | |
|---|---|---|---|
| 4,078,125 | 5/1978 | Brown | 429/125 |
| 4,132,547 | 1/1979 | Buzzelli et al. | 75/211 |
| 4,383,015 | 5/1983 | Buzzelli | 429/206 |
| 4,792,505 | 12/1988 | Moyes | 429/219 |
| 4,930,211 | 6/1990 | Gaudino | 29/623.5 |
| 5,200,281 | 4/1993 | Leap et al. | 429/121 |

*Primary Examiner*—Stephen Kalafut
*Assistant Examiner*—M. Nuzzolillo

[57] ABSTRACT

A bipolar silver-iron plate is provided in which both the silver electrode and iron electrode are fully charged upon fabrication. The iron electrode may be formed in a standard manner. The silver anode is formed by applying a paste formed from polyvinyl alcohol, water and silver oxide powder to a fiber grid provided on the anodic side of the bipolar plate. When dried, the paste forms a silver oxide electrode which is fully charged. If desired, the iron electrode can be formed in the same manner. When so formed, potassium hydroxide should be added to the polyvinyl alcohol water solution to prevent oxidation of iron powder. The silver and iron electrodes formed by this manner are malleable and can thus be fabricated into a multi-ply sheet and rolled around a cylindrical core to form a jelly-roll battery.

7 Claims, 2 Drawing Sheets

SILVER-IRON BATTERY

BACKGROUND OF THE INVENTION

1. Field of the Invention

This invention relates to the field of silver-iron batteries and, more particular, to a method for forming a silver-iron multi-cell bipolar battery and a silver-iron jelly roll battery cell.

2. Description of Related Art

The silver-iron battery cell is a stable, rechargeable electrochemical system that has a long cycle life and is capable of relatively high rates of charge and discharge. Brown, U.S. Pat. No. 4,078,125 discloses a high energy density iron-silver battery wherein a silver electrode and an iron electrode were coupled together as an electrochemical system. Buzzelli, U.S. Pat. No. 4,383,015, discloses an iron-silver battery having a shunt electrode in which a silver electrode and an iron electrode were also coupled together as an electrochemical system. In each of these patents, a sintered iron (Fe) electrode was utilized. A sintered silver electrode was produced using either Ag powder or a $Ag/Ag_2O$ powder mix. A separator system capable of retarding silver ion migration from the positive silver electrode to the negative iron electrode was also provided. These patents dealt primarily with prismatic, multiple-plate cell designs.

Most of the elements used in a prismatic, multiple-plate cell design are relevant to a bipolar system. However, the methods of fabricating bipolar electrodes are somewhat different than the methods used for prismatic design. The fabrication of silver-iron bipolar systems use both sintered iron and sintered silver electrodes. The sequence and methods for ultimately bonding these electrodes to a single bipolar structure can be problematic.

FIG. 1 shows a bipolar battery 10 comprised of two or more bipolar cells 12, 14, stacked in series in case 15. The unique feature of the bipolar construction is that the anode 16 of one cell 14 is in direct electrical contact with the cathode 18 of the next cell 12 in the series through a metal sheet called the bipolar plate 20. Bipolar plate 20 serves as the intercell connector, the current collector, the barrier which prevents electrolyte communication from one cell 12 to the next 14, and the substrate to which the electrochemically active material (silver or iron) must be bonded during manufacturing.

The fabrication of bipolar battery 10 includes the provision of end plate 22 to which negative terminal 24 is electrically connected and end plate 26 to which positive terminal 28 is electrically connected. An anode 30 is provided along end plate 26 and a cathode 32 is provided along end plate 22. Separators 34 are provided between each of the electrodes in each of cells 12 and 14. Finally, electrolyte 36 is provided in each of cells 12 and 14.

In fabricating bipolar battery 10, bonding the active electrode materials to the bipolar plate 20 is a difficult task. One method commonly used is to press and sinter bond iron (Fe) powder onto one side of the plate at 700°–800° C., and then press and sinter bond Ag or $Ag_2O$ powder onto the opposite side of the plate at 400°–500° C. During the first sintering process, the iron remains in the Fe state, which is the electrochemically charged state of iron. During bonding of the silver material, however, all silver species are reduced to the Ag state, which is the electrochemically discharged state of the silver. Subsequently, when the cell stack is assembled, it must go through an electrochemical silver formation charge to convert Ag to $Ag_2O$. Only when the silver anode is in the form of $Ag_2O$ may the cell then be discharged.

The problem with this commonly-used approach is that $H_2$ gas evolves from the already-charged iron electrode during the initial Ag formation charge. This evolution of gas causes the cells to dry out. Because the bipolar cells are designed to be packed very tightly together with only a minimum of space between electrodes, the amount of electrolyte provided in the cells is also kept to a minimum. The gassing at the iron electrode starves the cells of electrolyte, which greatly limits the effectiveness of the battery in subsequent cycles. This problem is not encountered in prismatic cell designs where plates are not stacked so tightly together and where cells are flooded with excess electrolyte by design.

The largest obstacle to the development of a working silver-iron bipolar battery has been the technique for applying the silver active material to the bipolar plate. Prior to the present invention, the commonly-used techniques have resulted in coupling of a fully charged iron electrode and a fully discharged silver electrode. Consequently, there is a need for a method to fabricate a bipolar plate which results in the coupling of a fully charged iron electrode and s fully charged silver electrode.

Commercial secondary alkaline batteries are presently being manufactured in two basic design configurations, the rectangular prismatic design discussed above and the cylindrical jelly-roll design. Nickel-cadmium, lead-acid, carbon-zinc, manganese-zinc, mercury-zinc, and the various lithium couples are the most prevalent electrochemistries used in the jelly-roll configuration. One method of constructing a jelly-roll battery cell is to roll flexible electrodes around a central removable dowel rod, thus producing a cylindrical core called a "jelly-roll". Different sized rolls produce the familiar A, AA, C, and D cells that support an enormous consumer market for power tools, flashlights, cameras, computers, radios, and the like. These cells weigh only ounces and supply relatively low power and capacity.

The prismatic design can be constructed in much larger sizes than the jelly-roll cell and therefore can support much greater power and energy requirements. Electrochemistries such as silver-zinc, nickel-iron, and silver-iron are examples of cells that are typically produced in the prismatic configuration. However, several of the electrochemical couples used in the jelly-roll configuration are also manufactured in the prismatic configuration, such as nickel-cadmium and lead-acid. Prismatic cells are made up of flat plates, either the pocket or sintered types, which are stacked face-to-face thus producing a rectangular-shaped cell. They are operated in a flooded electrolyte condition, and require special venting considerations. Applications for large prismatic designs range from 50 pound batteries for cars and lift vehicles to batteries weighing tons for use on submarines.

By far the most successful electrochemistries from a commercial standpoint are the lead-acid and nickel-cadmium couples. It is no coincidence that both of these electrochemistries have been successfully engineered in both the jelly-roll and prismatic designs, thus covering essentially all possible markets.

Silver-iron couples have only been constructed in the prismatic configuration. The rigid nature of the sintered silver and iron electrodes has restricted their use to a flat-plate design.

Judging from the commercial success of the nickel-cadmium and lead-acid batteries, it is desirable to manufacture cells in both the prismatic and jelly-roll configurations. In order to adapt the silver-iron system from a prismatic design to a cylindrical jelly-roll design, the sintering step in the manufacture of both the silver and iron electrodes has to be eliminated. By eliminating the sintering step, the electrodes would be be more malleable or pliable, and capable of being rolled into a jelly-roll configuration. However, this has to be accomplished while retaining structural integrity and maintaining electronic contact of active materials to current collector grids.

Wet-pasting techniques such as those disclosed by Folser in U.S. Pat. No. 4,132,547, have been used for producing iron electrodes. However, such wet-pasting techniques are for pasting iron oxide ($Fe_2O_3$) which has to be reduced to Fe, and in the process sintered to form a rigid plaque. No wet-pasting methods of an iron electrode manufacture are known to produce a flexible plate. Accordingly, there is a need for a method to produce a pliable, malleable electrode of iron in the fully reduced state and silver in the $Ag_2O$ or Ag states.

SUMMARY OF THE INVENTION

A method for forming a bipolar plate is provided in which a fiber grid is sintered bonded to a first side of the bipolar plate. A reduced iron oxide powder is pressed and sinter bonded to the opposite side of the bipolar plate. A paste formed from polyvinyl alcohol, water, and silver oxide powder is applied to the fiber grid previously applied to the bipolar plate. Finally, the bipolar plate is dried to form a fully charged bipolar plate.

The paste used to form the silver electrode can also be used to form a malleable, pliable electrode which can find utility in other designs such as the jellyroll cell. Likewise, a malleable iron cathode can be formed from a paste comprising a slurry of reduced iron powder mixed with a solution of polyvinyl alcohol, water and potassium hydroxide. This slurry can be pasted into a metal current collector grid. A malleable silver anode can be formed from a paste comprising a slurry of silver oxide powder mixed with a solution of polyvinyl alcohol and water, the slurry being pasted into a metal current collector grid. A cylindrical silver-iron battery cell can be fabricated using a multi-ply sheet having such a malleable iron cathode and a malleable silver anode separated by a pair of separators, one of the pair provided between the anode and cathode and the other of the separators provided outside either the anode or cathode. The multi-ply sheet can then be wrapped around a cylindrical core to form the jelly-roll battery cell. As with the bipolar cell, this jelly-roll cell is fully charged upon assembly, does not need a silver formation charge, and avoids the gassing and drying out problems described above.

DETAILED DESCRIPTION OF THE PREFERRED EMBODIMENT

DESCRIPTION OF THE PREFERRED EMBODIMENTS

In order to form a fully charged bipolar plate 20, a technique needed to be developed to bond $Ag_2O$ material to the bipolar plate 20 without sintering. First, a metal fiber grid or expanded metal grid is sinter bonded to the bare bipolar plate 20. The Fe powder is pressed and sintered bonded to the other side of the plate 20 as usual. A paste of polyvinyl alcohol, water, and $Ag_2O$ powder is then applied into the metal fiber grid or expanded metal grid. The whole assembly is then oven dried under nitrogen at a temperature in the range of 50°-70° C. This drying process removes anywhere from 1% to 70% of the water in the $Ag_2O$ paste and contact bonds the $Ag_2O$ slurry to the current collector grid. The drying step at these relative low temperatures does not reduce $Ag_2O$ to Ag. The electrode may preferably be pressed at 0.25-1.0 ton/in.sq. to further consolidate the mass if desired.

A silver electrode 16 manufactured in this manner is in an electrochemically fully charged state. A bipolar plate 20 having such fully charged electrodes 16 and 18 may be stored for later manufacture or assembled into bipolar cell and batteries which are ready for discharge upon addition of electrolyte. Because the silver anode 16 is not sinter-bonded to bipolar plate 20, no silver formation charge is necessary. Therefore, the associated drying out of the cell caused by the evolution of gases is not observed. Consequently, the performance of the cells is greatly enhanced in comparison to those manufactured using previous techniques.

Figure 2:
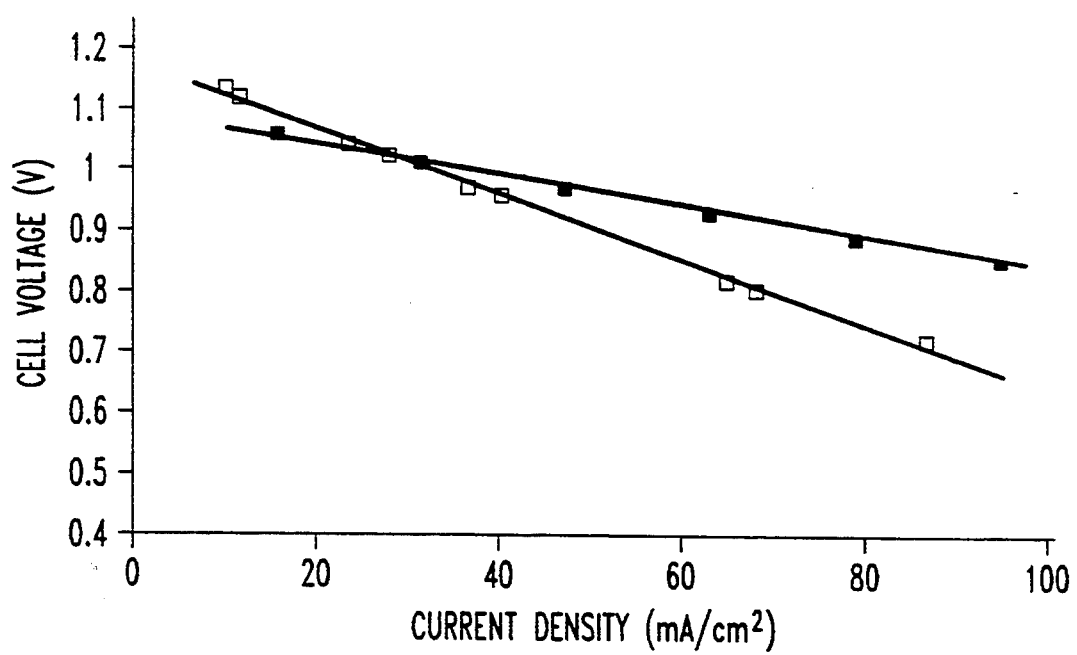
FIG. 2 is a graph showing the results of an experiment comparing the cell voltage as a function of current density for a bipolar silver-iron cell of the present invention and a prior art monopolar cell.

Results of experimental testing of the pasted $Ag_2O$ bipolar plate 20 are provided in FIG. 2. In the experiment, a bipolar silver-iron cell having a resistance of 2.6 Ohm-cm$^2$ was compared to a nonpolar (prismatic) cell having a resistance of 5 Ohm-cm$^2$ FIG. 2 demonstrates that a bipolar plate formed in accordance with the present invention provides superior power to sintered silver-iron cells of the monopolar (prismatic) cell design.

To develop the paste used in the silver electrode 16, the silver powders had to be slurried in an appropriate liquid. It is is desirable that this liquid have a relatively low vapor pressure to keep the paste from drying out too quickly, and a high viscosity to hold it intact in the current collector grid structure. To meet these needs, a solution of polyvinyl alcohol and water was developed. The ratios of polyvinyl alcohol to water are dependent on the viscosity which is desired in the final paste, but mixtures up to the solubility limit of polyvinyl alcohol and water are possible. This solution serves as the base liquid for the silver paste. The silver powder is slurried directly with the polyvinyl alcohol/water mixture to produce a workable paste. In addition to polyvinyl alcohol, other binders such as methylcellulose and polyox may be used in the slurry formulation.

An iron electrode 18 can also be formed using a paste formed by iron powder slurried in the appropriate liquid. Unlike with the silver powder, an additive is necessary for use with the iron powder to keep the iron from oxidizing to $Fe_2O_3$. For this purpose, 5%-10% by weight potassium hydroxide was added to the polyvinyl alcohol/water base liquid before use with the iron powder. However, other concentrations of potassium can be used. The iron powder can then be slurried in the polyvinyl alcohol/water/potassium hydroxide solution to produce a working paste.

Figure 1:
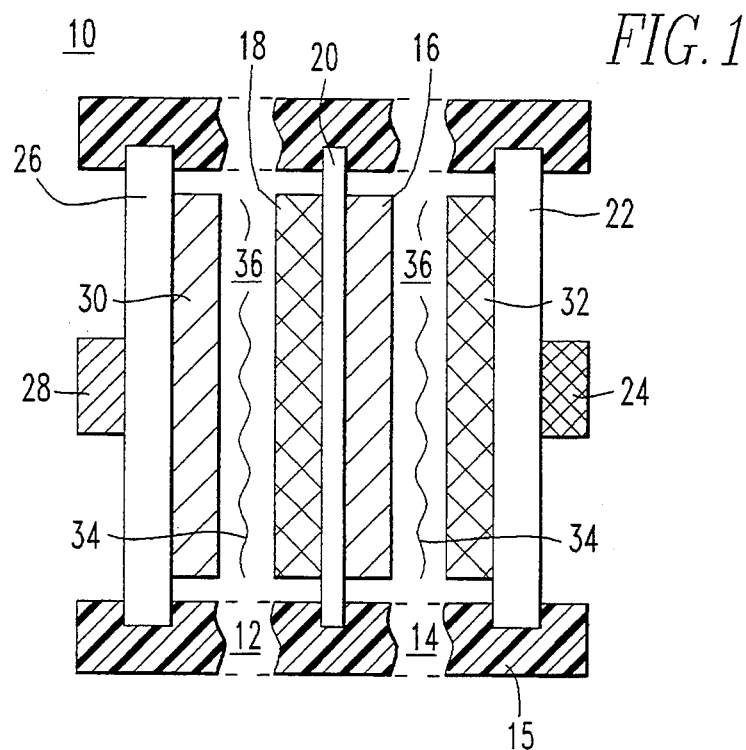
FIG. 1 is a schematic drawing of a two-cell bipolar battery having a bipolar plate formed in accordance with the present invention.
Figure 3:
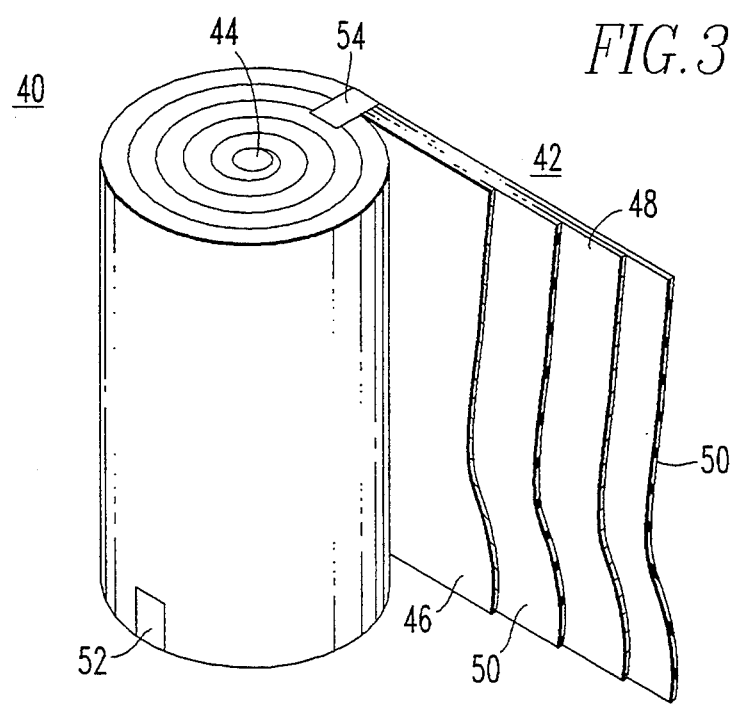
FIG. 3 is a schematic drawing of a cylindrical jelly-roll silver-iron cell in accordance with the present invention.

The iron and silver pastes can be applied to a metal current collector grid to produce a flexible or malleable iron or silver electrode in the charged state. Such malleable electrodes can be used to produce a jelly-roll silver-iron cell. FIG. 3 shows an example of such a cell 40. Jelly-roll cell 40 is formed from a multi-ply sheet 42 wrapped around a cylindrical core 44. Negative iron electrode 46 and positive silver electrode 48 make up the two main components of multi-ply sheet 42. Iron electrode 46 and silver electrode 48 are spaced apart by separator sheet 50. In addition, a second separator sheet 50 is provided adjacent silver electrode 48 to form a four-layer, multi-ply sheet 42. A negative tab 52 is in electrical contact with iron electrode 46 and positive tab 54 is in electrical contact with silver electrode 48. Tabs 52 and 54 serve as the electrical connection to the case into which jelly-roll cell 40 is provided.

The metal current collector used to form the iron electrode 46 and silver electrode 48 of jelly-roll cell 40 can be a fiber grid, an expanded metal grid, or any grid that will hold the viscous paste. The iron and silver slurries pasted to such a metal current collector grid can be used to produce a flexible or malleable iron electrode in the charge state, or, if desired, in the discharge state. Because the paste can be constituted from reduced iron powder for he anode and from silver oxide for the cathode, these two malleable electrodes 46 and 48 can be combined to produce a jelly-roll cell 40 that is fully charged upon assembly. Because such a cell is fully charged, in does not require an electrochemical silver formation charge to convert Ag to $Ag_2O$. Therefore, such a cell avoids the generation of $H_2$ gas and the associated drying out of the tightly-rolled cell, much the same as was described earlier for the bipolar cell.

In the foregoing specification certain preferred practices and embodiments of this invention have been set out, however, it will be understood that the invention may be otherwise embodied within the scope of the following claims.

We claim:

1. A cylindrical silver-iron battery cell comprising a multi-ply sheet wrapped around a cylindrical core, said multi-ply sheet comprising:
   a. a malleable iron anode having a tab provided thereon;
   b. a malleable silver cathode having a tab provided thereon; and
   c. two separators, one of said separators provided between said anode and said cathode and the other one of said separators provided outside one of said anode and said cathode.

2. The battery cell of claim 1 wherein said malleable iron anode is formed from a paste comprising a slurry of reduced iron powder mixed with a solution of polyvinyl alcohol, water and potassium hydroxide, said slurry being pasted into a metal current collector grid.

3. The battery cell of claim 2 wherein said metal current collector grid is selected from the group consisting of a fiber grid and an expanded metal grid.

4. The battery cell of claim 1 wherein said malleable silver cathode is formed from a paste comprising a slurry of silver oxide powder mixed with a solution of polyvinyl alcohol and water, said slurry being pasted into a metal current collector grid.

5. The battery cell of claim 4 wherein said metal current collector grid is selected from the group consisting of a fiber grid and an expanded metal grid.

6. A method for forming a cylindrical iron battery comprising the steps of:
   a. forming a multi-ply sheet comprising a malleable iron anode having a tab provided thereon, a malleable silver cathode having a tab provided thereon, and two separators, one of said separators provided between said anode and said cathode and the other of said separators provided outside one of said anode and said cathode; and
   b. wrapping said multi-ply sheet about a cylindrical rod.

7. A method for forming a bipolar plate for use in a battery having a case within which are disposed first and second spaced-apart end plates, each being connected to a respective terminal, a positive electrode being bonded to said first end plate and a negative electrode being bonded to said second end plate, at least one said bipolar plate having first and second sides and being provided between said end plates, said bipolar plate having a positive electrode bonded to said first side of said bipolar plate and a negative electrode bonded to said second side of said bipolar plate, comprising the steps of:
   a. sinter bonding a fiber grid to said first side of said bipolar plate;
   b. pressing and sinter bonding a reduced iron oxide powder to said second side of said bipolar plate;
   c. applying a paste formed from polyvinyl alcohol, water and silver oxide powder to said fiber grid; and
   d. drying said bipolar plate.

* * * * *